United States Patent [19]

Varma

[11] Patent Number: 4,935,114
[45] Date of Patent: Jun. 19, 1990

[54] MICROWAVE-ENHANCED CHEMICAL PROCESSES

[75] Inventor: Ravi Varma, Hinsdale, Ill.

[73] Assignee: The United States of America as represented by the United States Department of Energy, Washington, D.C.

[21] Appl. No.: 244,779

[22] Filed: Sep. 15, 1988

[51] Int. Cl.$^5$ .................. B01J 19/08; A61L 2/12
[52] U.S. Cl. .................. 204/157.43; 204/158.2; 204/158.21; 204/157.94; 204/157.95; 422/21
[58] Field of Search ............. 204/157.3, 157.43, 158.2, 204/158.21, 157.94, 157.95; 422/21

[56] References Cited

U.S. PATENT DOCUMENTS

| | | | |
|---|---|---|---|
| 4,050,907 | 7/1976 | Brimhall | 48/111 |
| 4,345,983 | 5/1981 | Wan | 204/157.43 |
| 4,435,374 | 7/1981 | Helm | 423/415 A |

OTHER PUBLICATIONS

Varma, "Microwave-Assisted Chemical Process for Treatment of Hazardous Waste", DOE/HWP-28, ANL-86-20.

Steindler, "Chemical Technology Division Annual Technical Report 1986", pp. 5-6 and 78-79, ANL-87-19.

Chemical Abstracts 87: 70374v, 87: 8041f, 85: 166188x and 85: 162542k.

Primary Examiner—John F. Niebling
Assistant Examiner—Ben C. Hsing
Attorney, Agent, or Firm—Hugh G. Glenn; Robert J. Fisher; William R. Moser

[57] ABSTRACT

A process for disposal of toxic wastes including chlorinated hydrocarbons, comprising, establishing a bed of non-metallic particulates having a high dielectric loss factor. Effecting intimate contact of the particulates and the toxic wastes at a temperature in excess of about 400° C. in the presence of microwave radiation for a time sufficient to break the hydrocarbon chlorine bonds and provide detoxification values in excess of 80 and further detoxifying the bed followed by additional disposal of toxic wastes.

18 Claims, 1 Drawing Sheet

MICROWAVE-ENHANCED CHEMICAL PROCESSES

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

Halohydrocarbon compounds can be detoxified by high temperature (1200° C.) incineration in air, steam or oxygen. However, corrosion problems are serve and temperature-time parameters to avoid PICs (products of incomplete combustion including dioxins) are not easily maintained. Use of microwave heating for incineration (at 1000° C.) of radioactive contamined ion-exchange resins in low-level mixed wastes has been reported.

Microwave-assisted surface effects which result in enhanced reaction rates for oxidation of trichloroethane (TCE) by air at silicon carbide surfaces, in a packed or fluid bed of the same material (granular form) has been found effective in detoxifying TCE, which was used as a representative of toxic compounds.

SUMMARY OF THE INVENTION

A principal object of the invention is to detoxify toxic waste by the use of microwave energy in a packed or fluid bed wherein the toxic waste is present in the bed or is passing through the bed.

Another object of the present invention is to provide a process for disposal of halogenated hydrocarbons comprising, effecting intimate contact between a non-metallic particulate material and the halogenated hydrocarbons, subjecting the non-metallic particulate material to microwave radiation of not less than about 915 MHz so as to generate a high intensity oscillating electrical field at the surface of the particulate material to produce in the presence of an oxygen-containing gas chloride ions and oxidation products from the halogenated hydrocarbon.

Yet another object of the present invention is to provide a process for disposal of toxic waste material comprising, effecting intimate contact between particulates having a high dielectric loss factor and the toxic waste material, subjecting the particulates in contact with the toxic waste material to microwave radiation to generate a high intensity oscillating electrical field at the surface of the particulates to elevate the temperature thereof, maintaining contact of the toxic material and the particulates in the presence of the microwave radiation for a time and at a temperature sufficient to detoxify more than 80% of the toxic material.

A final object of the present invention is to provide a process for disposal of chlorinated hydrocarbons, comprising, establishing a bed of non-metallic particulates having a high dielectric loss factor, effecting intimate contact of the particulates and the chlorinated hydrocarbons at a temperature in excess of about 400° C. in the presence of microwave radiation for a time sufficient to break the hydrocarbon chlorine bonds and provide detoxification values in excess of 80%.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DETAILED EMBODIMENT

Figure 1:
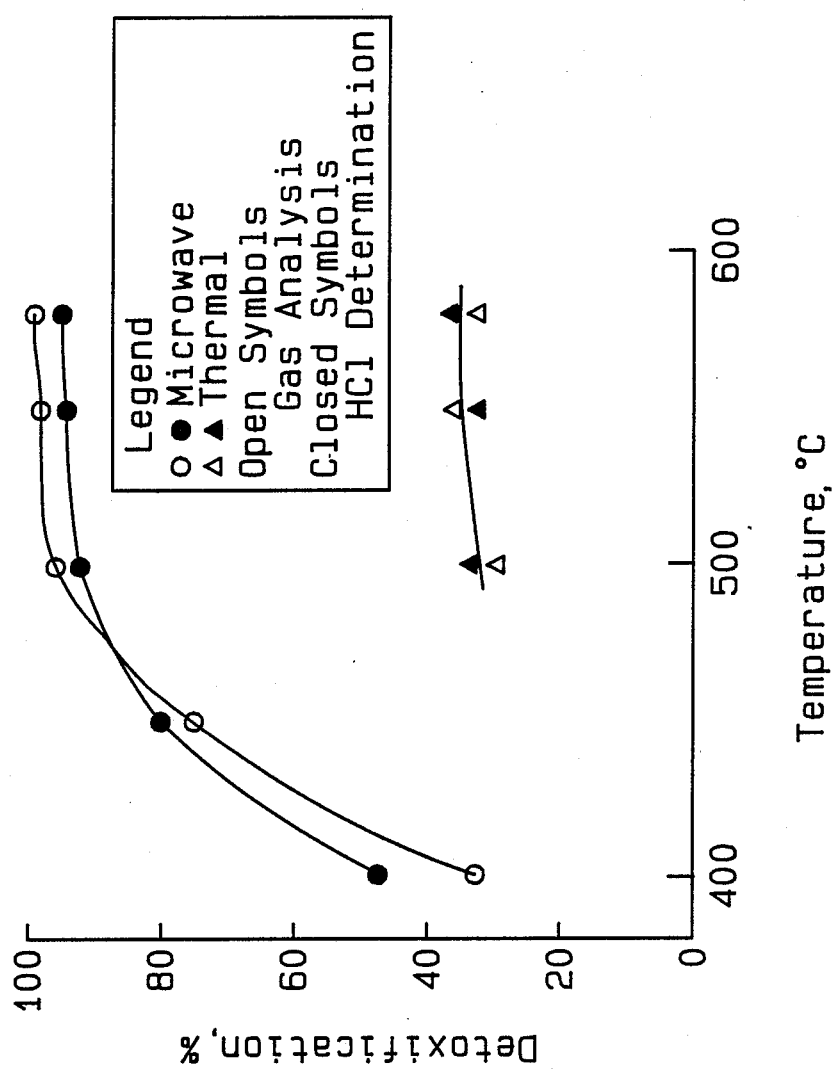
FIG. 1 is a graphic illustration showing the difference in efficiency of breaking carbon bonds in a simulated toxic waste by the application of thermal energy and the application of microwave energy.

A microwave oven (CEM Model MDS-81 oven with 600-W output) was modified to energize a flowthrough reactor. The detoxification method chosen was to oxidize the TCE adsorbed on activated carbon by air in the presence of catalysts with microwave (2.45 GHz frequency) in situ heating.

A known weight of active carbon (6 to 10 g) was placed in the sample tube, which was placed within the microwave oven. The sample tube was made of quartz and had a 12-mm ID, with standard joints at both ends. A quartz tube was used because of its transparency of microwave radiation and its high softening temperature. The tube was detachable and could be weighed when needed. The active carbon was initially dried in a nitrogen stream; at a 50% power setting, the sample drying was complete in 30 min. The dry weight of the carbon was noted. Trichloroethylene was placed in one of the bubblers (the third bubbler was packed with glass wool and worked as a demister), and nitrogen gas carried the vapors onto the active carbon. During the adsorption step, the oven was not energized, and adsorption took place at ambient temperature (21°–22° C.). After the adsorption step, the sample tube was weighed, the weight of the TCE adsorbed was noted, and the tube was placed back in the cavity. The flow of air was then started through the carbon bed and the oven was energized at the same time. Active carbon beds with and without catalyst loading were used in the detoxification experiments. The active carbons were obtained from the Calgon Corporation. The characteristics of these carbons are described in Tables 1 and 2.

The major products of reaction from microwave heating of active carbon (with and without catalyst) with preadsorbed TCE in air streams were identified by mass spectral analyses to be HCl, $CO_2$, CO, $CH_2H_2CL_2$, etc. The evolved gas analysis system consisted of an ice trap (to remove any high boiling product), a gas sampling loop, and one bubbler containing 1N NaOH solution. Periodic gas samples for mass spectroscopic analysis were taken by adjusting the two four-way stopcocks without disturbing the flow of evolved gas. Hydrochloric acid produced in an experimental run from degradation of TCE was adsorbed in the NaOH bubbler. The dissolved chloride solution was then precipitated and separated as AgCl and analyzed quantitatively. This step provided an independent integration of the total HCl produced during an experimental run.

Some effects of microwave radiation (2.45 GHz) on active carbons not heretofore known were observed. When the carbon was irradiated by microwaves in various experimental runs, small sparks appeared throughout the bed. The intensity of the sparks decreased with time, but isolated sparks were still observed after heating for about 60 min. Following acid washing of the coconut-shell carbon, a material with very low mineral content was obtained, but the phenomenon of sparking remained unaltered. It is believed that small semicrystalline regions exist in commercial active carbons and that these regions are centers for strong absorption of microwave radiation.

TABLE 1

Characteristics of Active Carbons Used in Experiments

| Name | Mesh | Source | Nitrogen BET Surface Area ($m^2$/g dry) | Composition, wt. % | | | | | |
|---|---|---|---|---|---|---|---|---|---|
| | | | | Ash | $Cr_2O_3$ | CuO | C | H | N |
| Base Carbon | 12 × 30 | Coal | 1050 | 8.6 | — | — | 90.3 | 0.65 | 0.55 |
| FCA Calgon | 12 × 30 | Base carbon + catalyst | 950 | 20.1 | 3.8 | 9.7 | 78.4 | 0.83 | 0.67 |
| PCB Calgon | 12 × 30 | Coconut shell | 1100 | 3.2 | — | — | — | — | — |

TABLE 2

Analysis of Ash From Calgon Carbons

| | Base Carbon, wt % | FCA, wt % |
|---|---|---|
| $Al_2O_3$ | 31.2 | 10.2 |
| CaO | 3.0 | 1.1 |
| $Cr_2O_3$ | 0.1 | 19.0 |
| CuO | 0.3 | 48.7 |
| $Fe_2O_3$ | 10.6 | 3.5 |
| MgO | 1.2 | 0.4 |
| $Na_2O$ | 1.5 | 0.5 |
| SrO | 0.4 | 0.1 |
| $TiO_2$ | 2.4 | 0.4 |
| BaO | 0.4 | 0.1 |
| $SiO_2$ | 45.2 | 15.1 |

Determining the adsorption characteristics of TCE vapor on active carbon was required prior to investigating microwave-assisted detoxification of TCE preadsorbed on carbon in air streams.

TCE can, of course, be adsorbed on active carbons from the vapor phase, and the extent of this adsorption depends on the nature of the carbon (surface area and chemical nature), the flow rate of the TCE stream, and the temperature of the bed. The adsorbed TCE can be desorbed by a gas stream (e.g., $N_2$, $N_2$+moisture) while the bed in simultaneously heated in situ by microwave radiation. Since the sorption/desorption characteristics of the carbon bed may have a potential application in the detoxification of TCE in an air stream originating either from TCE in a liquid state or in contaminated soil, both the sorption and desorption of TCE were investigated.

The sorption characteristics of TCE on two types of carbon beds (the Calgon FCA and PCB carbons, see Table 1) were investigated. The first type of carbon (Calgon FCA) contained catalysts such as CuO and $Cr_2O_3$; the second carbon (Calgon PCB) used a standard coconut-shell charcoal with a similar surface area but contained no catalyst. Streams of nitrogen were saturated with TCE by bubbling the gas through liquid TCE at 22° C. (vapor pressure of TCE, p(TCED)=59 torr at 22° C.). This stream was then passed through a column of glass wool to remove any mist before it was passed through the respective carbon beds for TCE loading. The flow was stopped periodically, and the column was weighed to determine the quantity of TCE that was adsorbed. The catalyst-containing carbon was shown to have a slightly higher capacity for TCE absorption than did the coconut-shell carbon.

A number of experiments on oxidative degradation of TCE preadsorbed on active carbon under microwave heating, with dry and moist air flowing over the carbon bed, were conducted. Besides the observed formation of HCl, other chlorine-containing species such as $C_2H_2Cl_2$ and $C_2HCl_3$ (TCE) were observed in the product gas stream. In a few experiments (e.g., Run 102), $CH_3Cl$ was also detected. The other major products formed from oxidative degradation of TCE were $CO_2$ and CO.

In one run, TCE vapor mixed with moist air was passed through a bed of carbon containing a CuO-$Cr_2O_3$ catalyst while the bed was irradiated with microwave radiation. The results showed that there was no decomposition of TCE. It was evident from this observation that no evolution of HCl took place. It was concluded that TCE does not undergo decomposition or oxidation if it is not preadsorbed on active carbon.

The remaining experiments were done with TCE preadsorbed on active carbon at room temperature (22° C.). Liquid TCE was placed in one of the bubblers, and $N_2$ gas was bubbled through it at a 100-mL/min flow rate; it was then passed through the active carbon bed (TM 6-8 g of carbon packed loosely), which was contained in a quartz tube for 30 min. After the adsorption step, the sample tube was weighed, and the increase in weight equaled the weight of TCE adsorbed. The flow of dry or moist air (i.e., air saturated with moisture by bubbling house air through a water bubbler at 25° C.) was started. The bed was heated by microwave radiation in all cases at the 20% power level. The total reaction time was 60 min. The carbon bed was weighed after reaction, and the used carbon was analyzed for chlorine. Gas samples were collected from the product gas stream during each experiment, to be analyzed by mass spectroscopy. A graphical integration of the HCl gas profile vs. time gave an estimate of total HCl formed in any particular reaction. The chloride formed in the NaOH absorber in each run was determined as AgCl to provide yet another estimate of total HCl produced. Tables 3–5 give the results of mass spectral analyses for typical exit gases.

TABLE 3

Oxidation of Trichloroethylene (Run No. 102) Preadsorbed on Carbon (Calgon FCA Carbon) with Cu and Cr Catalyst Oxidant: Moist Air; Flow Rate = 100 mL/min; Power Setting: 20% (Max = 600 W, 2.45 GHz Microwave)

| Time, min | 4 | 10 | 30 | 60 |
|---|---|---|---|---|
| Components | Amount, vol % | | | |
| $H_2O$ | 0.12 ± 0.06 | 0.06 ± 0.03 | 0.10 ± 0.05 | 0.06 ± 0.03 |
| $N_2$ | 38.9 ± 1.4 | 70.6 ± 1.8 | 76.2 ± 1.5 | 77.1 ± 1.5 |
| CO | 6.2 ± 0.6 | 0.7 ± 0.2 | 0.5 ± 0.5 | 0.5 ± 0.5 |
| $O_2$ | 0.05 ± 0.01 | 0.04 ± 0.01 | 0.04 ± 0.01 | <0.02 |
| HCl | 36.4 ± 3.6 | 7.1 ± 0.7 | 2.7 ± 0.3 | 0.01 ± 0.01 |
| Ar | 0.45 ± 0.02 | 0.8 ± 0.1 | 0.9 ± 0.1 | 1.0 ± 0.1 |
| $CO_2$ | 15.1 ± 0.8 | 19.8 ± 1.0 | 19.3 ± 1.0 | 20.8 ± 1.2 |
| $C_2H_2Cl_2$ | 1.1 ± 0.2 | 0.25 ± 0.02 | 0.08 ± 0.02 | 0.06 ± 0.02 |
| $C_2HCl_3$ | 0.4 ± 0.1 | 0.4 ± 0.1 | 0.07 ± 0.02 | 0.12 ± 0.03 |
| $NO_x$[a] | 0.6 ± 0.2 | 0.06 ± 0.03 | 0.03 ± 0.02 | 0.01 ± 0.01 |
| $C_2H_2$ | 0.2 ± 0.1 | 0.04 ± 0.02 | 0.02 ± 0.02 | ND |
| $(CH_3)_2CO$[b] | 0.5 ± 0.2 | 0.2 ± 0.1 | 0.11 ± 0.05 | 0.3 ± 0.1 |

TABLE 3-continued

Oxidation of Trichloroethylene (Run No. 102) Preadsorbed on Carbon (Calgon FCA Carbon) with Cu and Cr Catalyst
Oxidant: Moist Air; Flow Rate = 100 mL/min;
Power Setting: 20% (Max = 600 W, 2.45 GHz Microwave)

| Time, min | 4 | 10 | 30 | 60 |
|---|---|---|---|---|
| Components | | Amount, vol % | | |
| | c | c | c | |

[a] M/e 30 peak could be NOCl.
[b] The hydrocarbon traces reported in the previous samples include $(CH_3)_2CO$.
[c] Small peaks at M/e 73 and M/e 93 suggest traces of chlorodimethyl silane or chlorotrimethyl silane (mass spectroscopy artifacts).

TABLE 4

Oxidation of Trichloroethylene (Run No. 105) Preadsorbed on Carbon (Calgon Carbon PCB) without Catalyst
Oxidant: Moist Air; Flow Rate = 100 mL/min;
Power Setting: 20% (Max = 600 W, 2.45-GHz Microwave)

| Time, min | 1 | 3 | 6 | 12 | 20 | 40 |
|---|---|---|---|---|---|---|
| Components | | | Amount, Vol % | | | |
| $H_2O$ | 0.18 ± 0.05 | 0.7 ± 0.2 | 1.0 ± 0.3 | 0.6 ± 0.2 | 0.9 ± 0.3 | 1.4 ± 0.3 |
| $N_2$ | 96.4 ± 1.0 | 77.4 ± 1.9 | 69.4 ± 1.7 | 72.7 ± 1.8 | 76.5 ± 1.9 | 71.3 ± 1.8 |
| CO | trace | 0.8 ± 0.4 | 7.5 ± 1.7 | 8.4 ± 1.8 | 3.0 ± 0.9 | 8.5 ± 0.7 |
| $O_2$ | 3.2 | 1.2 ± 0.1 | 0.09 ± 0.02 | 0.07 ± 0.02 | 0.04 ± 0.01 | 0.05 ± 0.01 |
| HCl | <0.1 | 9.6 ± 1.0 | 9.3 ± 1.0 | 5.0 ± 0.05 | 1.5 ± 0.2 | 0.13 ± .10 |
| Ar | 0.16 ± 0.01 | 0.14 ± 0.01 | 0.43 ± 0.01 | 0.74 ± 0.02 | 0.80 ± 0.04 | 0.80 ± 0.05 |
| $CO_2$ | <0.02 | 7.5 ± 0.04 | 9.3 ± 0.5 | 9.9 ± 0.5 | 13.4 ± 0.8 | 14.9 ± 1.0 |
| $C_2H_2Cl_2$ | <0.01 | 0.14 ± 0.04 | 0.25 ± 0.05 | 0.14 ± 0.04 | <0.10 | <0.10 |
| $C_2HCl_3$ | <0.01 | 1.5 ± 0.2 | 1.9 ± 0.2 | 1.9 ± 0.2 | 3.4 ± 0.4 | 2.7 ± 0.3 |
| M/e = 30 | trace | <0.20 | 0.1 | 0.06 | 0.04 ± 0.02 | <0.01 |
| $C_2H_2$ | trace | <0.20 | <0.2 | 0.12 | trace | trace |
| M/e = 73 | trace | trace | trace | trace | trace | trace |
| M/e = 93 | trace | trace | trace | trace | trace | trace |
| $(CH_3)_2CO$ | trace | trace | 0.40 | 0.30 | 0.3 ± 0.1 | 0.1 ± 0.10 |

TABLE 5

Oxidation of Trichloroethylene (Run No. 106) Preadsorbed on Carbon (Calgon FCA Carbon) with Cu and Cr Catalyst
Oxidant: House Air; Flow Rate = 100 mL/min;
Power Setting: 20% (Max = 600 W, 2.45-GHz Microwave)

| Time, min | 2 | 5 | 10 |
|---|---|---|---|
| Components | | Amount, vol % | |
| $H_2O$ | 0.2 ± 0.1 | 0.2 ± 0.1 | 0.5 ± 0.2 |
| $N_2$ | 22.6 ± 1.1 | 57.9 ± 1.7 | 64.5 ± 1.3 |
| CO | 12.8 ± 1.1 | 4.2 ± 0.8 | 5.9 ± 1.0 |
| $O_2$ | 0.05 ± 0.01 | 0.04 ± 0.01 | 0.04 ± 0.01 |
| HCl | 41.1 ± 4.1 | 17.3 ± 1.7 | 5.4 ± 0.6 |
| Ar | 0.26 ± 0.02 | 0.67 ± 0.03 | 0.78 ± 0.03 |
| $CO_2$ | 16.3 ± 0.08 | 16.4 ± 0.8 | 19.9 ± 0.7 |
| $C_2H_2Cl_2$ | 2.4 ± 0.2 | 1.1 ± 0.1 | 0.7 ± 0.1 |
| $C_2HCl_3$ | 2.2 ± 0.2 | 1.7 ± 0.2 | 2.1 ± 0.2 |
| M/e = 30 | 0.4 ± 0.2 | <0.1 | <0.1 |
| $C_2H_2$ | 0.8 ± 0.2 | 0.2 ± 0.1 | <0.1 |
| $CH_3Cl$ | 0.3 ± 0.1 | 0.06 ± 0.03 | 0.05 ± 0.03 |
| M/e = 73 | <0.1102 | trace | not determined |

TABLE 5-continued

Oxidation of Trichloroethylene (Run No. 106) Preadsorbed on Carbon (Calgon FCA Carbon) with Cu and Cr Catalyst
Oxidant: House Air; Flow Rate = 100 mL/min;
Power Setting: 20% (Max = 600 W, 2.45-GHz Microwave)

| Time, min | 2 | 5 | 10 |
|---|---|---|---|
| Components | | Amount, vol % | |
| M/e = 93 | <0.3 | trace | trace |

The data obtained from all detoxification experiments were analyzed in terms of (1) initial TCE loading in the carbon bed, (2) calculated chlorine loading in carbon bed, (3) percent of original chlorine loading in bed that is retained in the bed after reaction (from chlorine analysis of the carbon bed), and 4 percent of original chlorine in gas phase as HCL, $C_2H_2Cl_2$, and $C_2HCl_3$ from mass spectroscopic analysis and HCL analysis from AgCl recovered. The experimental data obtained for a large number of runs for the case of dry or moist air were analyzed in this manner. The results of material balance, in terms of chlorine, are reported for some of these runs in Table 6.

TABLE 6

Chlorine Mass Balance Between Reactant and Products of Reaction from Trichloroethylene Oxidation Experiments Conducted with Microwave Heating at 20% Power Level, Air Flow at 100 mL/min, and Reaction Time of 60 Minutes

| | | | Adsorption | | Cl in[b] | Desorption/Detoxification | | | | |
|---|---|---|---|---|---|---|---|---|---|---|
| | | | $TCE^a$ | Calc. Cl | Carbon Bed | | Chlorine in Gas Phase,[b] wt % | | | Chlorine |
| Run No. | Fresh Carbon (Unused) | Air Flow | Loading (g/g) in Carbon | Loading (g/g) in Carbon | (% of Original Cl Loading) | Cl as HCl (from AgCl) | Cl as HCl (Gas Anal.) | Cl as $C_2H_2Cl_2$ (Gas Anal.) | Cl as $C_2HCl_3$ (Gas Anal.) | Accounted For % |
| 101 | FCA | dry | 0.217 | 0.176 | 37.3 | 41.3 | 45.5 | 4.1 | 3.9 | 90.8 |
| 106 | FCA | dry | 0.284 | 0.230 | 36.0 | 32.9 | 37.6 | 5.2 | 12.1 | 90.9 |
| 105 | Base Carbon | moist | 0.107 | 0.159 | 12.5 | 36.2 | 42.0 | 2.2 | 32.6 | 89.3 |
| 127 | PCB | moist | 0.180 | 0.146 | 8.2 | 36.5 | 41.8 | 5.1 | 29.2 | 84.3 |
| 102 | FCA | moist | 0.215 | 0.174 | 28.7 | 52.6 | 48.7 | 2.9 | 3.6 | 83.9 |
| 114 | FCA | moist | 0.268 | 0.217 | 29.2 | 30.9 | 37.5 | 6.1 | 10.6 | 84.3 |
| 119 | FCA | moist | 0.168 | 0.136 | 35.1 | 37.6 | 43.2 | 3.5 | 6.2 | 83 |

[a] As TCE initially preadsorbed on carbon bed.
[b] Chlorine retained in the bed after reaction and as HCl, $C_2H_2Cl_2$, and $C_2HCl_3$ species in gas stream.

Chlorine material balances on all runs are on the low side, probably because the absorption of HCl from gas phase in NaOH may not be complete, at least during the initial test period when the liquid volume expansion is quite large, and some chlorine may be accounted for as chlorides of Cr and Cu, which were found to be deposited on the glass surface beyond the carbon bed.

Since one advantage of microwave-assisted detoxification of TCE over the corresponding catalyzed oxidation of TCE conducted under thermal heating is its low-temperature operation, the temperature of the carbon beds during heating in the microwave oven (Model MDS-81) was measured. The active carbons, with and without the catalyst loading, have a high dielectric loss constant; consequently, they are expected to absorb microwave energy significantly.

All three types of carbons (base, FCA, and PCB carbons from Calgon Corp.) were subjected to microwave irradiation oat 2.45 GHz (max. power=600-W). The mass of carbon used in the quartz reactor tube was 6 to 10 g during the measurements.

All three types of carbon, when irradiated at the 50% power level in an $N_2$ stream at 100 mL/min. attained temperatures close to 425° C. At 20% power level in an $N_2$ stream, the temperature was observed to be about 330° C. after 2 min. of heating and remained so after longer heating periods.

The temperatures attained by active carbon beds during detoxification experiments in moist air streams were also measured. For FCA carbon with preadsorbed TCE, when subjected to microwave radiation in a stream of dry air at a flow rate of 100/min through the carbon bed (8 g) at 20% level, the temperature was about 425° C.; when moist air was used, the temperature was about 355° C. Routinely, the values recorded in moist air were 50°–100° C. lower than those recorded in dry air. This is a key element for safety. If an air and steam mixture flows over the carbon bed, the danger of carbon bursting into flame from temperature overruns may not exist.

In order that the microwave-assisted detoxification process be continuous and cost effective, the active carbon (with or without catalyst loading), once used in detoxification of TCE, must be regenerated in the same system. During microwave-assisted TCE desorption, some TCE conversion to $CO_2$ and HCl was observed.

Desorption of TCE from the carbon bed was obtained by four successive steps. In the first step, dry nitrogen was passed through the TCE loaded bed while the bed was subjected to microwave irradiation (2.45 GHz, 25% power level). In the second step, dry nitrogen was passed through the bed, and the power was increased to the 50% level. In the third step, the nitrogen was presaturated with water at 22° C. (p$H_2O$=19.8 torr) and passed through the bed with a power setting of 25%. In the fourth step, nitrogen was presaturated with water at 40° C. (p$H_2O$=55.3 torr) with a power setting of 50%. The gas flow rate for the studies was 150 mL/Min and was maintained for 30 minutes.

During the desorption/detoxification step, the weight loss of the bed was determined after each step, and any HCl generated was determined by monitoring the chloride content of a 1.0N NaOH solution that was used to scrub the exit gases. The results of the four-step study, shown in Table 7, indicate that HCl is formed in eact step, even in dry nitrogen. The presence of HCl in the exit gas indicates that TCE is being, in part, converted to HCl.

The results indicate that, under in situ heating by microwave radiation, TCE and the detoxification products are more readily desorbed from a catalyst-free bed than from one containing catalyst.

TABLE 7

TCE Desorption/Detoxification Characteristics of Active Carbon Beds[a]

| | | Active Carbon with Catalyst | | Active Carbon without Catalyst | |
|---|---|---|---|---|---|
| | Treatments | TCE Mass Desorbed (wt %) | TCE Converted to HCl (wt %) | TCE Mass Desorbed (wt %) | TCE Converted to HCl (wt %) |
| I | Dry nitrogen flow, 25% power for 30 min | 50.9 | 14.4 | 63.9 | 16.2 |
| II | Dry nitrogen flow, 50% power for 30 min | 9.9 | 1.7 | 22.2 | 4.9 |
| III | Moist nitrogen flow (p$H_2O$ = 19.8 mm Hg), 25% power for 30 min | 3.4 | 9.5 | 6.2 | 21.3 |
| IV | Moist nitrogen flow (p$H_2O$ = 55.3 mm Hg), 50% power for 30 min. | 15.8 | 14.3 | 2.6 | 8.2 |
| | Total | 80.0 | 39.9 | 94.9 | 50.6 |

[a]The amounts of TCE initially adsorbed were 0.168 g and 0.154 g on the catalyst-free and catalyst-containing beds, respectively.

For both microwave and thermal runs, the reactor was a one-inch diameter quartz tube filled with a fritted quartz disc on which the bed material (technical grade silicon carbide-60×8 mesh) was placed. The settled bed height of 6 inches and two flow rates of air were used. In the case of microwave runs, the bed temperature was maintained by dielectric heating by 2.45 GHz microwaves. The bed was viewed through an opening in the cavity by an infrared pyrometer (IRCON 6000 Series). In the thermal runs, the same bed was electrically heated using a long (18″ long) tube furnace. Both the infrared pyrometer and the temperature sensor of the thermal furnace was calibrated with a standard test furnace.

Two types of analyses were performed on reaction products: (1) determination of total HCl evolved as AgCl, and (2) mass spectrographic composition determination of exit gases. Before conducting an actual detoxification run, the TCE in the carrier gas was adsorbed by a pre-weighed active carbon bed at 0° C., bypassing the reactor itself. The increase in weight of the carbon bed gave a reliable measure of the feed rate in an actual experiment.

Thermal runs were conducted at 500°, 550°, and 580° C. For microwave runs five temperatures —400°, 450°, 500°, 550° and 580° C. was used. Two air flow rates, 252 and 510 cc/min., were used.

The product gases after passing through the gas sampling loop were absorbed in 1N NaOH solution and the quantity of HCl evolved for a reaction period of 30 minutes was determined quantitatively. Detoxification was defined as the percentage of the chlorine determined as AgCl divided by the feed chlorine.

The results are given in Table 8. In a typical run 96% or more of TCE as detoxified over a packed silicon carbide bed at 500° C. using microwave heating with an air flow rate of 252 cc/min. The corresponding figures for thermal runs were much lower. The graph of FIG. 1 shows the enormous difference between detoxification using microwave energy as opposed to thermal energy with detoxification values of 98% being obtained with microwave energy.

TABLE 8

Composition of Feed and Product Gas for Typical Trichloroethane Detoxification Runs at 500° C. for 30 minutes using gas/flow of 252 cc/min.

| | Gas Composition (Volume %) | | |
|---|---|---|---|
| | Feed Gas | Thermal Run | Microwave Run |
| $H_2O$ | — | 0.34 ± 0.08 | 0.12 ± 0.04 |
| $N_2 + A$ | 73.5 | 69.3 ± 1.3 | 64.3 ± 1.7 |
| $O_2$ | 19.5 | 18.1 ± 0.5 | 7.5 ± 0.2 |
| HCl | — | 4.6 ± 0.8 | 14.5 ± 1.5 |
| CO | — | 0.0 ± 0.0 | 8.2 ± 1.7 |
| $CO_2$ | — | 0.38 ± 0.04 | 5.4 ± 0.3 |
| $C_2H_2Cl_3$ | 6.9 | <0.3 | <0.04 |
| $C_2H_2Cl_2$ | 0.0 | 6.8 ± 1.3 | <0.03 |
| $C_2HCl_3$ | 0.0 | <0.3 | <0.05 |
| Detoxification* | — | 26 | 98 |

*Detoxification ± (1 - chlorine in product gas/Chlorine in feed) × 100

It is clearly seen that under microwave activation, a much higher degree of oxidative degradation of trichloroethane is obtained than in the case of thermal runs. For example, the C-C bond is readily cleaved with microwave heating, but remains in tact under thermal activation under the same experimental conditions.

Although microwave frequencies of 2.45 GHz have been reported herein, microwave frequencies as low as 915 MHz have been used satisfactorily in the performance of the invention. A 915 MHz microwave is generated by a commercial 50 KW-915 MHz unit. As herein reported the fluidizing medium used in the various runs reported herein have been air as well as moist air. Packed beds as opposed to fluidized beds have also been successfully used in the performance of the invention.

In general, the bed materials must be any high dielectric loss material which is nonmetallic. Suitable bed materials have been various ceramics such as silicon carbide or active carbon with and without catalyst such as copper oxide and chromium oxide. Zeolites with and without catalysts such as silver or aluminum oxide have been used. Also satisfactory for bed material is hapocalite ($MNO_2+CuO$) as well as silicon dioxide loaded with catalytic amounts of $V_2O_5$-$K_2SO_4$. Either cordorite or mullite having catalytic amounts of Pt-Pd-Rh are also satisfactory as is bismuthmolybdenum loaded silicon dioxide with $Cu_2O$.

In general a significant advantage to the present invention is the ability to detoxify material including various halogenated halocarbons at temperatures in the range of 500° C. to 600° C. as opposed to the prior art process which require temperatures in excess of 1000° C. As before seen in the material described above, the fluidized or packed beds may be run in steady state conditions by alternating detoxifying runs with regenerating runs.

While there has been disclosed what is considered to be the preferred embodiment of the present invention, it is understood that various changes in the details may be made without departing from the spirit, or sacirficing any of the advantages of the present invention.

What is claimed is:

1. A process for disposal of halogenated hydrocarbons comprising, effecting intimate contact between a non-metallic particulate material and the halogenated hydrocarbons to adsorb said halogenated hydrocarbons on to said non-metallic particulate material, subjecting said non-metallic particulate material to microwave radiation of not less than about 915 MHz so as to generate a high intensity oscillating electrical field at the surface of said particulate material in the presence of an oxygen-containing gas to produce by chemical reaction chloride ions and oxidation products from the halogenated hydrocarbons, desorbing said halogenated hydrocarbons from said non-metallic particulate material by passing dry nitrogen gas into contact with said non-metallic particulate material while subjecting said material to microwave irradiation at a first power level, increasing the microwave irradiation to a second power lever of about twice that of said first power level, subsequently passing moist nitrogen gas into contact with said material while subjecting said material to microwave irradiation at said first power level, and then increasing said microwave irradiatin to said second power level.

2. The process of claim 1, wherein the particulate material includes a ceramic.

3. The process of claim 2 wherein the ceramic is SiC.

4. The process of claim 1, wherein the particulate material includes a carbon doped with catalytic amounts of $C_uO$ and $Cr_2O_3$.

5. The process of claim 1, wherein the particulate material includes a zeolite.

6. The process of claim 1, wherein the particulate material includes a zeolite doped with catalytic amounts of Ag on $Al_2O_3$.

7. The process of claim 1, wherein the particulate material includes hapocalite ($MnO_2+C_uO$).

8. The process of claim 1, wherein the particulate material is $SiO_2$ doped with catalytic amounts of $V_2O_5$-$K_2SO_4$.

9. The process of claim 1, wherein the particulate material is corderite or mullite doped with catalytic amounts of Pt-Pd-Rh.

10. The process of claim 1, wherein the particulate material is $SiO_2$ doped with catalytic amounts of Bi-Mo and $Cu_2O$.

11. The process of claim 1, wherein the microwave radiation is in the range of from about 915 MHz to about 3GHz.

12. The process of claim 1, wherein the oxygen containing gas is air and the reaction takes place at atmospheric pressure.

13. The process of claim 1 wherein the moist nitrogen gas is presaturated with water at a first temperature and passed into contact with said material while subjecting said material to microwave irradiation at said first power level followed by presaturating the moist nitrogen gas with water at a second temperature higher than said first temperature while subjecting said material to microwave irradiation at said second power level.

14. A process for disposal of toxic waste material comprising, effecting intimate contact between particulates having a high dielectric loss factor and the toxic waste material to adsorb said toxic waste material onto said particulates, subjecting the particulates in contact with the toxic waste material to microwave radiation to generate a high intensity oscillating electrical field at the surface of the particulates to elevate the temperature thereof, maintaining contact of the toxic material and the particulates in the presence of the microwave radiation for a time and at a temperature sufficient to detoxify more than 80% of the toxic material, desorbing said toxic waste material from said particulates by passing dry nitrogen gas into contact with said particulates while subjecting said particulates to microwave irradiation at a first power level, increasing the microwave irradiation to a second power level of about twice that of said first power level, subsequently passing wet nitrogen gas into contact while subjecting said particulates to microwave irradiation at said first power level, and then increasing said microwave irradiation to said second power level.

15. The process of claim 14, wherein the particulates are SiC.

16. The process of claim 15, wherein the elevated temperature is greater than about 500° C. and the toxic waste material includes chlorinated hydrocarbons and the detoxification value is in excess of 98%.

17. The process of claim 16, wherein the particulates are maintained as a fluidized bed by flowing air therethrough when the microwave radiation is present.

18. The process of claim 14, wherein the particulates are activated carbon having catalytic amounts of CuO and $Cr_2O_3$ therein and having the toxic material preabsorbed thereon.

* * * * *